(12) United States Patent
Maass

(10) Patent No.: US 8,034,263 B2
(45) Date of Patent: Oct. 11, 2011

(54) MULTI-LAYER PANEL AND METHOD OF MANUFACTURING SUCH A PANEL

(75) Inventor: Uwe Maass, Dubai (AE)

(73) Assignee: Musion IP Limited (GB)

( * ) Notice: Subject to any disclaimer, the term of this patent is extended or adjusted under 35 U.S.C. 154(b) by 176 days.

(21) Appl. No.: 12/340,157

(22) Filed: Dec. 19, 2008

(65) Prior Publication Data

US 2010/0007959 A1    Jan. 14, 2010

Related U.S. Application Data

(60) Provisional application No. 61/080,411, filed on Jul. 14, 2008.

(51) Int. Cl.
*B29D 11/00* (2006.01)
*B29C 41/22* (2006.01)

(52) U.S. Cl. .......... 264/1.9; 264/1.7; 264/255; 264/308; 264/314

(58) Field of Classification Search ............ 264/1.1, 264/1.7, 1.9, 255, 313, 314, 308, 315; 425/808
See application file for complete search history.

(56) References Cited

U.S. PATENT DOCUMENTS 3,251,908 A * 5/1966 Wilenius et al. ............. 264/1.7
4,188,358 A * 2/1980 Withoos et al. ............. 264/255

* cited by examiner

*Primary Examiner* — Mathieu D. Vargot
(74) *Attorney, Agent, or Firm* — Thomas, Kayden, Horstemeyer & Risley, LLP.

(57) ABSTRACT

A method of manufacturing a multi-layer panel having a curved reflective and/or transmitting facing layer that includes the steps of increasing and/or decreasing pressure on a side of a thin membrane to form a pressure differential across the thin membrane that causes the thin membrane to deform to a required shape; applying a first layer of material to an outer surface of the thin membrane while the thin membrane is maintained in the required shape by the increase and/or decrease in pressure, and allowing the first layer of material to cure for a pre-determined time.

14 Claims, 4 Drawing Sheets

MULTI-LAYER PANEL AND METHOD OF MANUFACTURING SUCH A PANEL

CROSS-REFERENCE TO RELATED APPLICATIONS

This application claims priority to U.S. Provisional Patent Application No. 61/080,411, entitled "Live Teleporting System and Apparatus" filed on Jul. 14, 2008. The foregoing provisional is incorporated by reference herein.

FIELD OF THE INVENTION

The present invention relates to a multi-layer panel and in particular a method of manufacturing such a panel.

BACKGROUND OF THE INVENTION

Parabolic reflectors (or paraboloids) and mirrors are a spherical cap with a polished, well-reflecting surface. The paraboloid has the property that an on-axis parallel beam of radiation will be reflected by the surface and concentrated at its focus (or conversely, a point source located at the focus will produce a parallel beam on reflection).

Parabolic mirrors form two types of images of objects: real and virtual images. If the object is placed on the axis of revolution and further from the surface of the mirror than the focal point, the image formed is the real image. If the object is between the mirror and the focal point a virtual image is formed. If the object is placed at the focal point no image is formed.

Mirrors constituted by a glass sheet having a reflective coating of, for example, silver or black are of course very well known. Particularly in the case of large mirrors, they suffer from the disadvantage that they must often be made unduly heavy in order to reduce the risk of their breaking, and the weight and thickness of glass required can make such mirrors unsuitable for use in some circumstances.

It has been recognized that it has been difficult to mechanically deform a rigid mirror into a precise concave shape and maintain it in that concave shape without it having defects which might vary the focal point of the mirror. This problem is particularly prevalent in constructing paraboloid shaped mirrors. Consequently, in constructing concave mirrors, particularly of large focal length, the most frequently suggested construction techniques have been to either mold a reflective facing layer and a holding layer into the desired shape, or to apply a reflective layer as a coating on a surface which has already been formed in the desired configuration.

Accordingly, it is desirable to develop a method of manufacturing a parabolic mirror with a large focal length without it having defects which might vary the focal point of the mirror.

SUMMARY OF THE INVENTION

According to a first aspect, the present invention provides a method of manufacturing a multi-layer panel having a curved reflective and/or transmitting facing layer, the method comprising the steps of: increasing and/or decreasing the pressure on a side of a thin membrane to form a pressure differential across the thin membrane that deforms the thin membrane to a required shape; and applying a first layer of material to an outer surface of the thin membrane whilst the thin membrane is maintained in the required shape by the increase and/or decrease in pressure, and allowing the first layer of material to cure for a pre-determined time.

The thin membrane may comprise a thin plastic film or a thin foil. The method may further comprise applying a second layer of material to the first layer of material whilst the thin membrane is maintained in the required shape by the increase and/or decrease in pressure and allowing the second layer of material to cure for a pre-determined time, the second layer of material used to reinforce the multi-layer panel. Forming the pressure differential may further comprise sealing the thin membrane to a pressure chamber, the pressure chamber being pressurised or de-pressurised to deform the thin membrane to the required shape. A sealing device may be placed on the thin membrane to assist in sealing the pressure chamber to the thin membrane. The method may further comprise at least one frame to which the thin membrane is attached to, the at least one frame attached to the pressure chamber by at least one clamp to form a seal between the at least one frame and the pressure chamber. Sealing either the thin membrane to the pressure chamber or the at least one frame to the pressure chamber may comprise attaching an o-ring to either the thin membrane or the at least one frame. The method may further comprise when the pressure chamber is pressurised the thin membrane forms a concave shape and when the pressure chamber is depressurised the thin membrane forms a convex shape. The required shape of the thin membrane may be a parabolic shape. The method may further comprise abrading the outer surface of the thin membrane whilst still under a pressure differential to provide a mechanical key to the outer surface of the thin membrane.

The first layer of material may comprise a plastic that is cured by the application of a catalyst or very low heat. These materials are generally from the thermosetting category of plastics, such materials could be polyesters, epoxies, silicones or polyurethanes. The first layer of material may be a slow curing material. The first layer of material may further comprise aluminium or other suitable filler to increase the viscosity of the first layer material. The first layer of material may further comprise a black dye added to the first layer of material to enhance the reflectivity of the multi-layer panel.

The second layer of material may comprise a fibre glass mat impregnated with a polyester resin, the polyester resin cured by mixing the polyester resin with a suitable catalyst. The predetermined time for cure of either the first or second layer of material may be from a few minutes up to at 24 hours.

According to a further aspect, the present invention provides a mirror comprising: a concave thin foil membrane stiffened by a first layer placed on an outer surface of the thin foil membrane to provide structural rigidity to the mirror.

The required shape of the thin membrane may be a parabolic shape comprise a plastic that is cured by the application of a catalyst or very low heat. These materials are generally from the thermosetting category of plastics, such materials could be polyesters, epoxies, silicones or polyurethanes. The first layer of material may be a slow curing material. The first layer of material may further comprise aluminium or other suitable filler to increase the viscosity of the first layer material. The first layer of material may further comprise a black dye added to the first layer of material to enhance the reflectivity of the mirror. The mirror may further comprise a second layer of material, the second layer of material used to reinforce the mirror. The second layer of material may comprise a fibre glass mat impregnated with a polyester resin, the polyester resin cured by mixing the polyester resin with a suitable catalyst.

According to a still further aspect, the present invention provides an apparatus for producing a multi-layer panel having a curved reflective and/or transmitting facing layer, the apparatus comprising: at least one frame to which a thin membrane is attachable; a pressure chamber adapted to allow a seal to form between the at least one frame and the pressure chamber; and wherein the pressure chamber is arranged to create a pressure differential across the thin membrane to deform the thin membrane to a required shape, when the frame containing the thin membrane is attached to the pressure chamber; and a means for applying a first layer and a second layer to the thin membrane to form the multi-layer panel whilst the multi-layer panel is maintained in the pressure differential state by the pressure chamber.

To be effective in delivering a highly realistic and immersive experience, the virtual image should be HD video and if a human figure, life size. This is produced by using a foil which is vacuum blown to form a shape in a purpose built housing, to adopt and then retain the shape used in the cast of curved reflectors. The advantage of using foil is not just the ease of construction there is also the fact that the film will potentially be lighter weight than a solid polymer bowl of similar size. The key advantage is size. Optically clear/semi transparent fire retardant antistatic foil of widths 6-8 meters would provide the necessary sheet size enabling a mirror to reflect virtual images sized up to 2 m high×2 m wide.

The various features of novelty which characterize the present invention are pointed out with particularity in the claims annexed to and forming part of this disclosure. For a better understanding of the present invention, its operation, advantages and specific objects attained by its use, reference should be had to the accompanying drawings and descriptive matter in which preferred embodiments of the invention are illustrated and described.

DESCRIPTION OF PREFERRED EMBODIMENT

A limiting factor for parabolic mirrors is the size of the mirror itself—being limited to the limited size of casting tools used in the parabolic 'bowl' or mirror manufacture.

Figure 1:
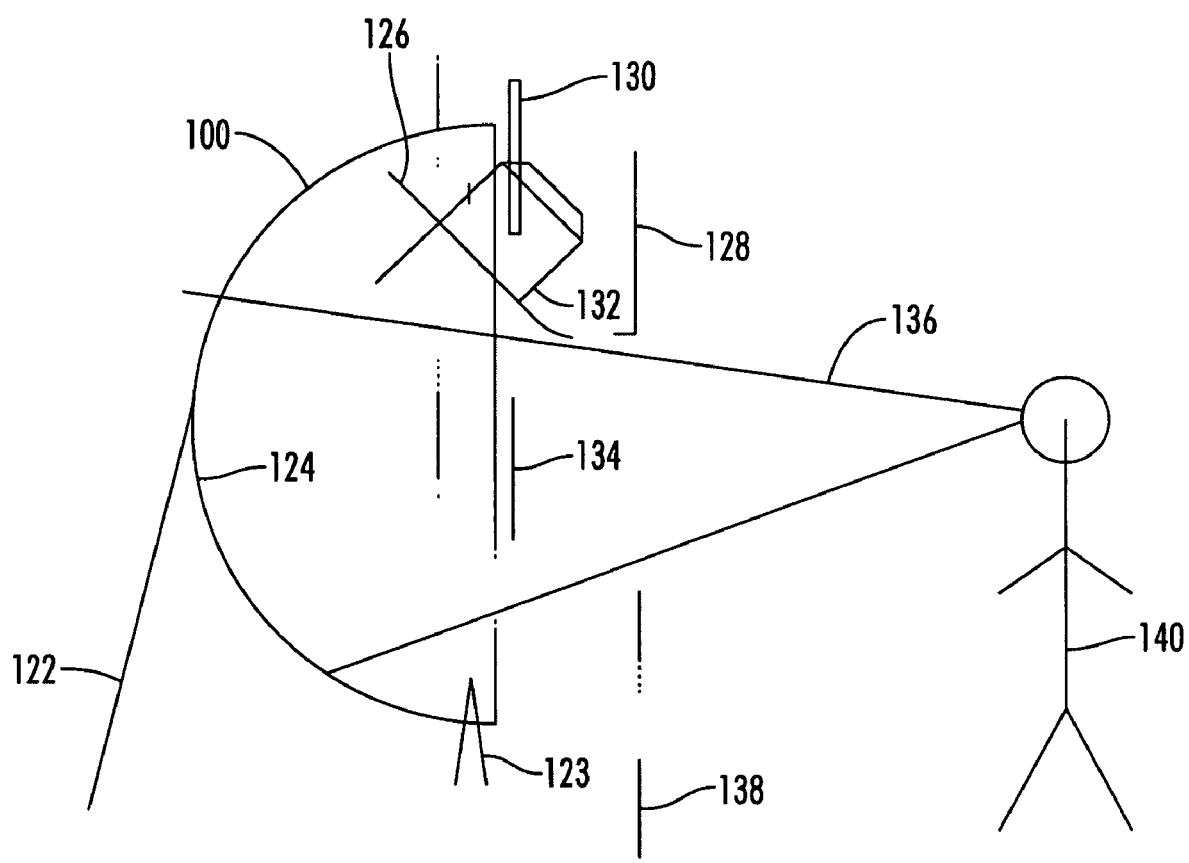
FIG. 1 is a schematic of a parabolic mirror used for projecting a virtual image in accordance with an embodiment of the present invention.

FIG. 1 shows a multi-layer parabolic mirror 100 used for producing a virtual image or hologram 134. The distance between the position of the virtual image 134 and the multi-layer panel or parabolic mirror 100 and a reflective or transmitting surface 124 (i.e. how far image appears in front of the mirror 100) is determined by the depth of the mirror 100 or bowl's concavity as well as its actual size and the distance between a direct video source 132 and mirror centre. FIG. 1 shows the parabolic bowl or mirror 100, configured with the direct video source 132 such as a monitor or LED screen as well as a projector (not shown) beaming onto a rear projection screen directed towards the central area of the parabolic mirror 100. Direct video source 132 can be moved up and down, left and right, and in and out relative to the mirror 100 using adjustable arm 130. The parabolic mirror 100 is supported by legs 122, 123 and the display device 132 and legs 122, 123 are masked from the viewer by masks 126, 128 and 138. The perceived hologram or virtual image 134 is viewed by the viewer 140 placed in front of the parabolic mirror 100.

To be effective in delivering a virtual image 134, the image to be projected into the parabolic mirror 124 and reflected as a virtual image 134 should be projected as high definition (HD) video and if the projected image is to be a human figure, then the mirror must be capable of producing a life size virtual image 134.

Figure 3:
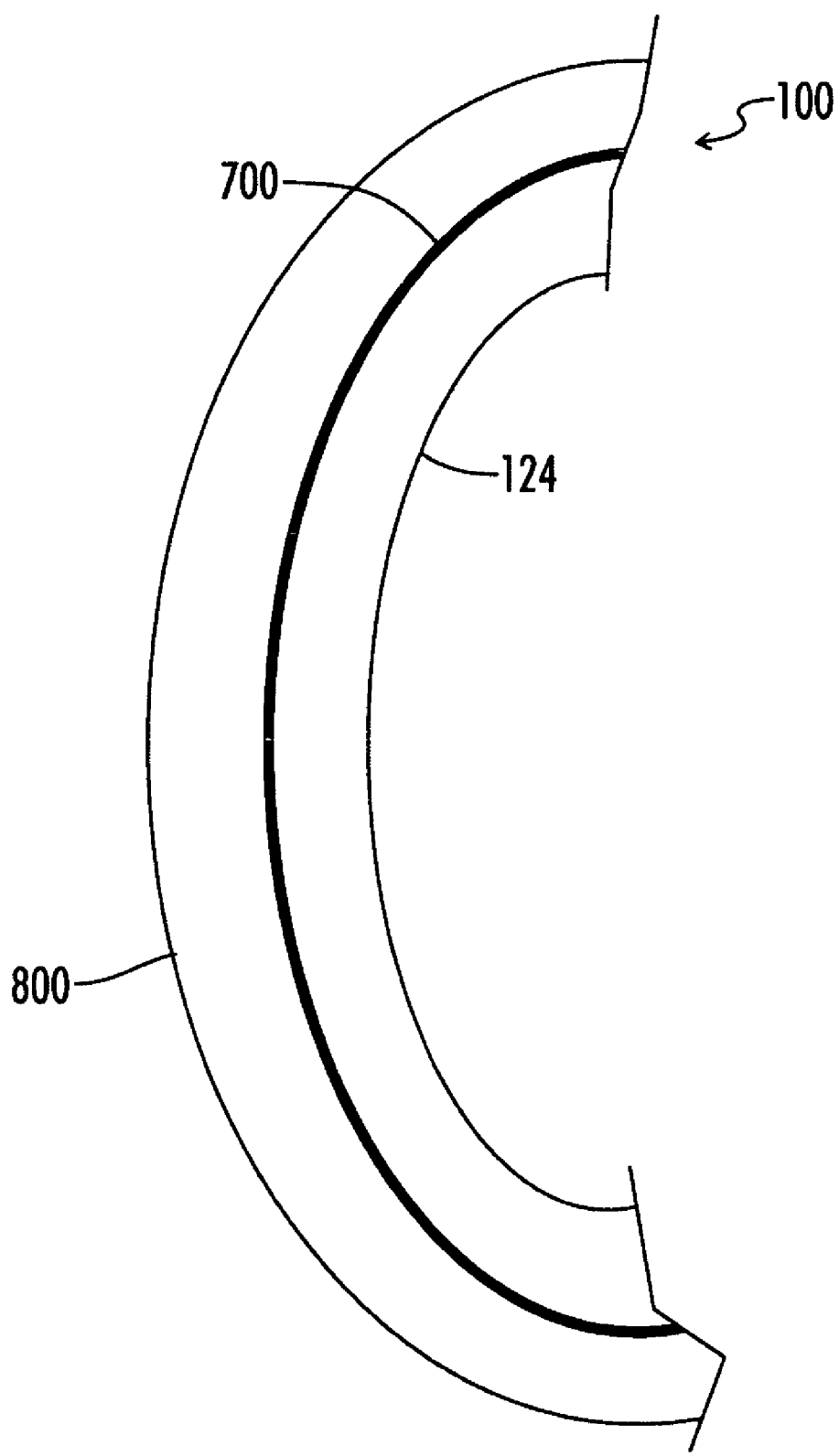
FIG. 3 is a perspective illustration of a multi-layer panel manufactured in accordance with an embodiment of the present invention.
Figure 4:
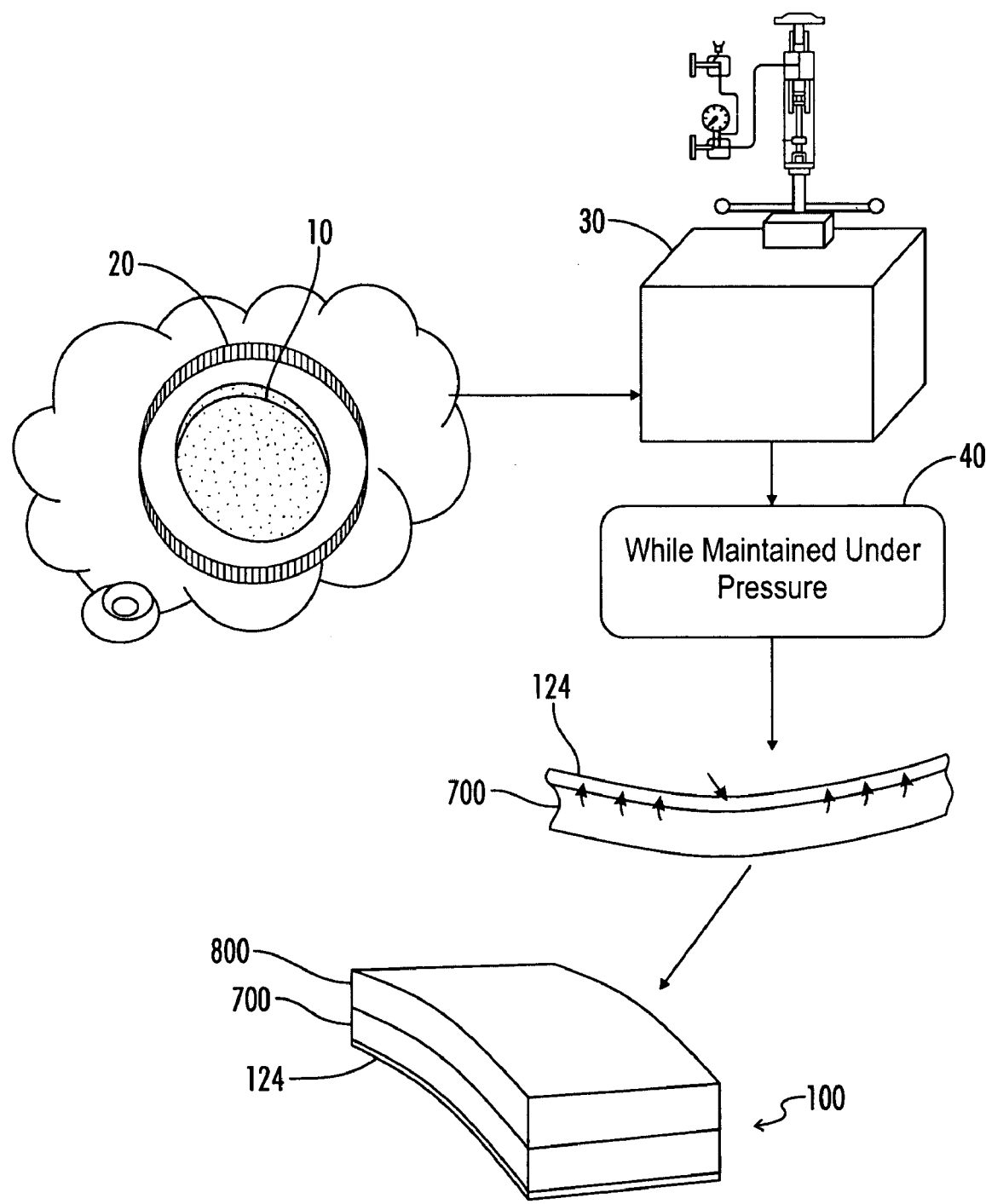
FIG. 4 shows a block diagram of the manufacturing process in accordance with an embodiment of the present invention.

To produce such an experience a multi-layer panel 100 having a curved reflecting or transmitting facing layer 124 is produced by blowing a thin plastic membrane 10 held in a circular frame 20 and then backed by a polyurethane layer 700 supported by fibre glass 800 to retain the shape of the parabola while being either pressurised or de-pressurised by a pressure chamber 30 as shown in FIGS. 3 and 4.

A thin plastic film, foil or membrane 10 is clamped between an inner and an outer circular frame 20. One of the frames 20 contains a sealing "O" ring (not shown). The two parts of the frame 20 can be held together by screws or bolts. The frame 20 with the thin membrane 10 is then placed on top of a pressure box or chamber 30 and temporary sealed to the box or chamber 30 by release clamps. The object of the clamps is to ensure an airtight seal between the frame 20 and the pressure chamber 30 and subsequently the thin membrane 10.

Air is then blown into the sealed chamber 30 and under pressure or a pressure differential the membrane 10 is blown up to form the shape of the multi-layer parabolic mirror 100. If the air is turned off the membrane 10 will collapse as it is unsupported. To produce a multi-layer mirror 100 it is necessary to support the membrane 10 to retain the original parabolic shape.

Whilst under pressure 40 the top surface of the membrane 10 which becomes the back surface of the multi-layer mirror 100 is lightly abraded with sandpaper to provide a mechanical key to the thin membrane 10 backing structure. Whilst under pressure 40 the abraded surface of the membrane 10 is coated with a first layer 700 of preferably a two component polyurethane (PU) and allowed to cure for up to 24 hours. The first layer may comprise any suitable plastic material that is cured by the application of a catalyst or very low heat. The plastic material may be any one of the group of materials comprising polyesters, epoxies, silicones or polyurethanes.

It is important to use a slow curing PU resin as a fast curing resin creates an exothermic heat reaction which causes the thin membrane 10 to wrinkle and lose its curvature. The PU is filled with aluminium or other suitable filler to increase the viscosity of the PU to aid its application and also to reduce the exothermic reaction. A black dye is also added to the PU to enhance the reflectivity of the multi-layer mirror 100.

Whilst still under pressure 40 and after the curing of the first layer 700 PU backing the multi-layer mirror 100 structure is reinforced by adding a second layer 800 of fibre glass mat which is impregnated with a polyester resin, the polyester resin cured by mixing the polyester resin with a suitable catalyst. The reinforced multi-layer mirror 100 is left for a further 24 hours to complete the curing process.

On completion of the backing curing process the air is turned off, the clamps released and the multi-layer parabolic mirror 100 in its circular frame 20 is removed from the pressure box 30.

A typical mirror is formed of a thin membrane 10, for example, a 100 micron PET foil, the first layer 700 PU backing of 2 mm thick, and a second layer 800 of fibreglass backing which is 4 mm thick. The circular frames 20 are constructed from plywood 25 mm thick. The multi-layer mirror 100 is 500 mm in diameter.

As described above a foil or thin membrane 10 is vacuum blown to form a required shape in purpose built housing (circular frame) 20, to adopt and then retain the shape used in the cast of parabolic reflectors or multi-layer mirrors 100. This is achieved by tensioning a foil (thin membrane) 10 vertically at the front of the structure 20, much as a screen faces a monitor. The foil edges 10 are sealed so that a vacuum applied 30 to the box behind the foil eventually sucks the foil into a pre determined parabolic shape. The foil depth of concavity could be varied according adjustment using variable vacuum pressure.

In a further embodiment the foil shape (multi-layer panel) 100 could be retained in operation by vacuum 30. Another method of forming from foil (thin membrane) 10 a parabolic shape for permanent use is to simultaneously feed a solidifying liquid substance into the box whilst the foil's correct parabolic shaped is retained under vacuum suction 30. Once the foam solidifies, the shape remains permanent. The foam is coloured black so once set the foil surface appears to be a shiny reflective black parabolic mirror 100.

The advantage of using foil is not just the ease of construction and potentially lighter weight than a solid polymer bowl of similar size. The key advantage is size. Optically clear/semi transparent fire retardant antistatic foil of widths 6-8 meters would provide the necessary sheet size enabling a parabolic mirror to reflect virtual images sized up to 2 m high×2 m wide.

Various configurations are suited to a variety of applications where virtual interactive figures would be of benefit. For stage applications the mirrors 100 may be used effectively face on to the live stage talent 140. The angle of view is such live talent 140 can simply reference themselves to interactive virtual images 134 for spatial distance as well as left right movement over reasonably large stage areas, yet the audience 140 do not see the virtual image 134 emitting from the foil parabolic mirror 100.

In other applications such as retail shop windows or museums the parabolic mirror 100 is arranged to face on the viewing audience 140.

Figure 2:
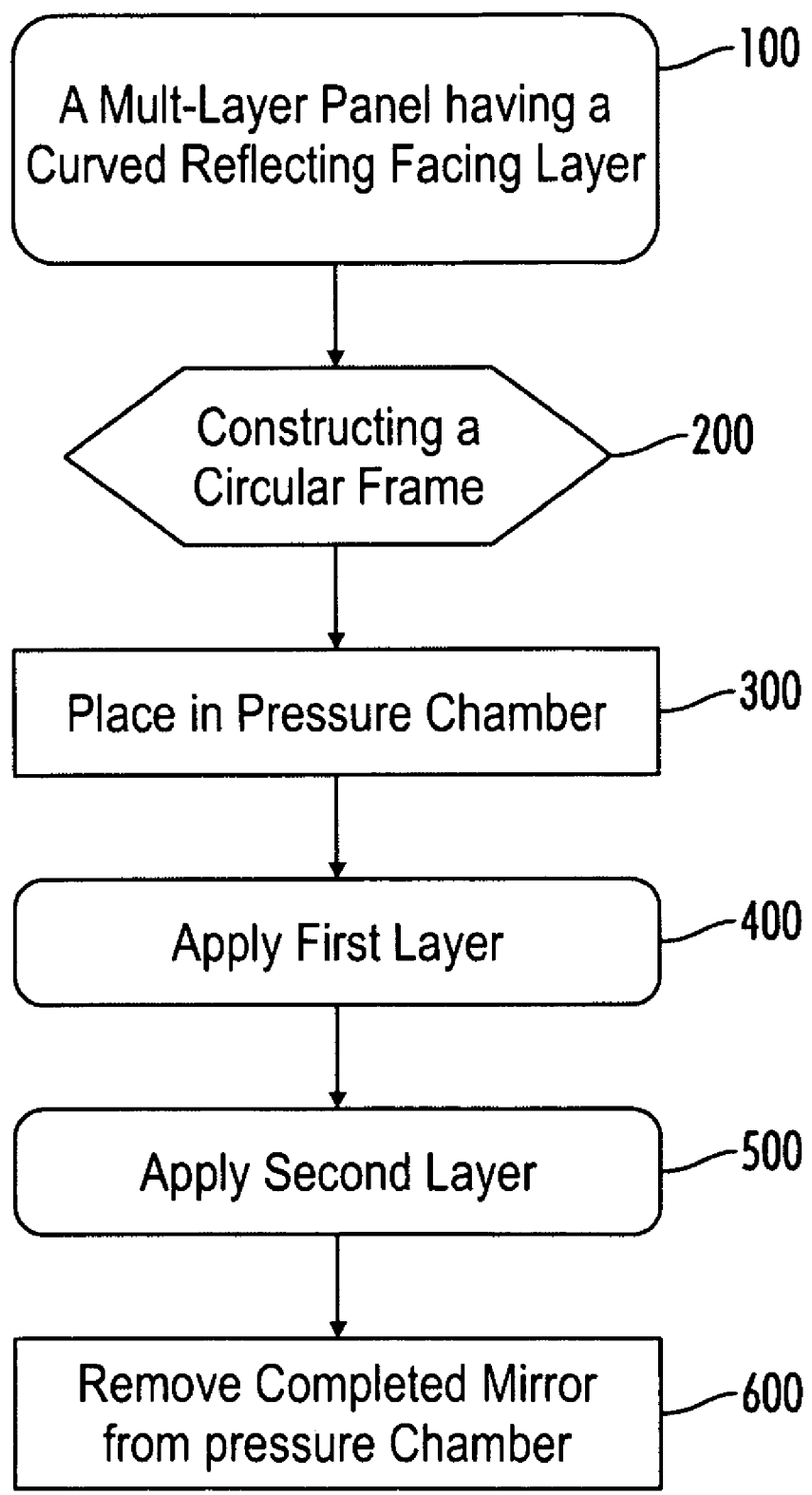
FIG. 2 is a flow diagram of a method of manufacturing a parabolic mirror in accordance with an embodiment of the present invention.

FIG. 2 shows the different steps involved in producing a multi-layer parabolic mirror panel 100. The first step involves constructing a frame 200 in this case a circular frame 20. A thin membrane 10 is placed between the two circular frames 20 and the combined frame 20 and thin membrane 10 are placed in a pressure chamber 30. The pressure chamber 30 being pressurised or de-pressurised 300 to form the thin membrane 10 to a required shape. Once the membrane 10 has formed the required shape a first layer 700 of material is applied 400 to an outer surface of the thin membrane 10 whilst still under pressure 40. The first layer 700 is then allowed to cure for a pre-determined time, the predetermined time being approximately 20 hours. Once the first layer 700 has cured a second layer 800 is applied 500 to the surface of the first layer 700. The second layer 800 of material being applied 500 to the first layer 700 of material whilst still under pressure 40 and allowing the second layer 800 of material to cure for a pre-determined time, the second layer of material used to reinforce the multi-layer panel. The predetermined time is approximately 20 hours. Once the second layer 800 has cured the completed multi-layer mirror 100 is removed from the pressure chamber 600.

It will be understood that the predetermined time for curing the first and second layer is chosen such that wrinkling of the thin membrane and loss of curvature is avoided. In other embodiments, the predetermined time may be from a few minutes up to 24 hours.

Although the present invention has been illustrated and described with respect to exemplary embodiment thereof, it should be understood by those skilled in the art that the foregoing and various other changes, omission and additions may be made therein and thereto, without departing from the scope of the invention. Therefore the present invention should not be understood as limited to the specific embodiment set out above but to include all possible embodiments which can be embodied within a scope encompassed and equivalent thereof with respect to the features set out in the appended claims.

The invention claimed is:

1. A method of manufacturing a multi-layer panel having a curved reflective and/or transmitting facing layer, the method comprising the steps of:
   clamping a thin membrane between an inner circular frame and outer circular frame the inner circular frame and the outer circular frame forming a frame;
   placing the frame and the thin membrane on top of a pressure chamber;
   temporarily sealing the frame and the thin membrane to the pressure chamber so that an airtight seal is formed between the frame and the pressure chamber;
   blowing air into the pressure chamber and, under pressure or pressure differential, blowing the thin membrane up to form a required shape;
   applying a first layer of material to an outer surface of the thin membrane while the thin membrane is maintained in the required shape;
   allowing the first layer of material to cure for a first predetermined time;
   applying a second layer of material to the first layer of material while the thin membrane is maintained in the required shape; and
   allowing the second layer of material to cure for a second predetermined time, the second layer of material reinforcing the first layer of material.

2. The method of claim 1, wherein the thin membrane comprises a thin plastic film or a thin foil and the frame and thin membrane are temporarily sealed to the pressure box or chamber using release clamps.

3. The method of claim 1, further comprising the step of attaching an o-ring to either the thin membrane or the frame.

4. The method of claim 1, wherein when the pressure chamber is pressurised the thin membrane forms a concave shape and when the pressure chamber is depressurised the thin membrane forms a convex shape.

5. The method of claim 1, wherein the required shape of the thin membrane is a parabolic shape.

6. The method of claim 1, further comprising the step of abrading the outer surface of the thin membrane while still under a pressure differential to provide a mechanical key to the outer surface of the thin membrane.

7. The method of claim 1, wherein the first layer of material comprises a plastic material that is cured by the application of a catalyst or low heat.

8. The method of claim 1, wherein the first layer of material comprises any one of the group of materials comprising polyesters, epoxies, silicones, and polyurethanes.

9. The method of claim 1, wherein the first layer of material is a slow curing material.

10. The method of claim 1, wherein the first layer of material comprises filler to increase the viscosity of the first layer material.

11. The method of claim 10, wherein the filler is aluminium.

12. The method of claim 1, wherein the first layer of material comprises a black dye added to the first layer of material to enhance the reflectivity of the first layer of material.

13. The method of claim 1, wherein the second layer of material comprises a fibre glass mat impregnated with a polyester resin, the polyester resin cured by mixing the polyester resin with a suitable catalyst.

14. The method of claim 1, wherein the first predetermined time and the second predetermined time ranges from a few minutes up to 24 hours.

* * * * *